United States Patent [19]
Hirano

[11] Patent Number: 4,796,251
[45] Date of Patent: Jan. 3, 1989

[54] DUAL-SIZED DISK PLAYER

[75] Inventor: Toshio Hirano, Saitama, Japan

[73] Assignee: Pioneer Electronic Corporation, Tokyo, Japan

[21] Appl. No.: 2,468

[22] Filed: Jan. 12, 1987

[30] Foreign Application Priority Data

Jan. 11, 1986 [JP] Japan ................................ 61-3979

[51] Int. Cl.⁴ .................... G11B 15/30; G11B 15/44; G11B 25/04
[52] U.S. Cl. .................... 369/75.2; 369/197; 369/265
[58] Field of Search .................. 369/75.2, 265, 197, 369/198

[56] References Cited

U.S. PATENT DOCUMENTS

| 4,575,836 | 3/1986 | Seto | 369/197 |
| 4,680,748 | 7/1987 | Kobayashi | 369/75.2 |
| 4,697,259 | 9/1987 | Takanashi | 369/75.2 |
| 4,715,025 | 12/1987 | Eijsermans | 369/75.2 |

Primary Examiner—Steven L. Stephan
Attorney, Agent, or Firm—Sughrue, Mion, Zinn, Macpeak & Seas

[57] ABSTRACT

A disk player for both optical and compact disk having two spindle motors for the two types of disk. One of the spindle motors is located far enough from the other spindle motors to receive its own smaller disk and is movable to allow the other spindle motor to receive the larger disk. The disks are carried on a tray to the respective spindle motor and are clamped thereagainst. The tray comprises two carriers for two disk sizes which are separable from each other inside the disk player.

4 Claims, 11 Drawing Sheets

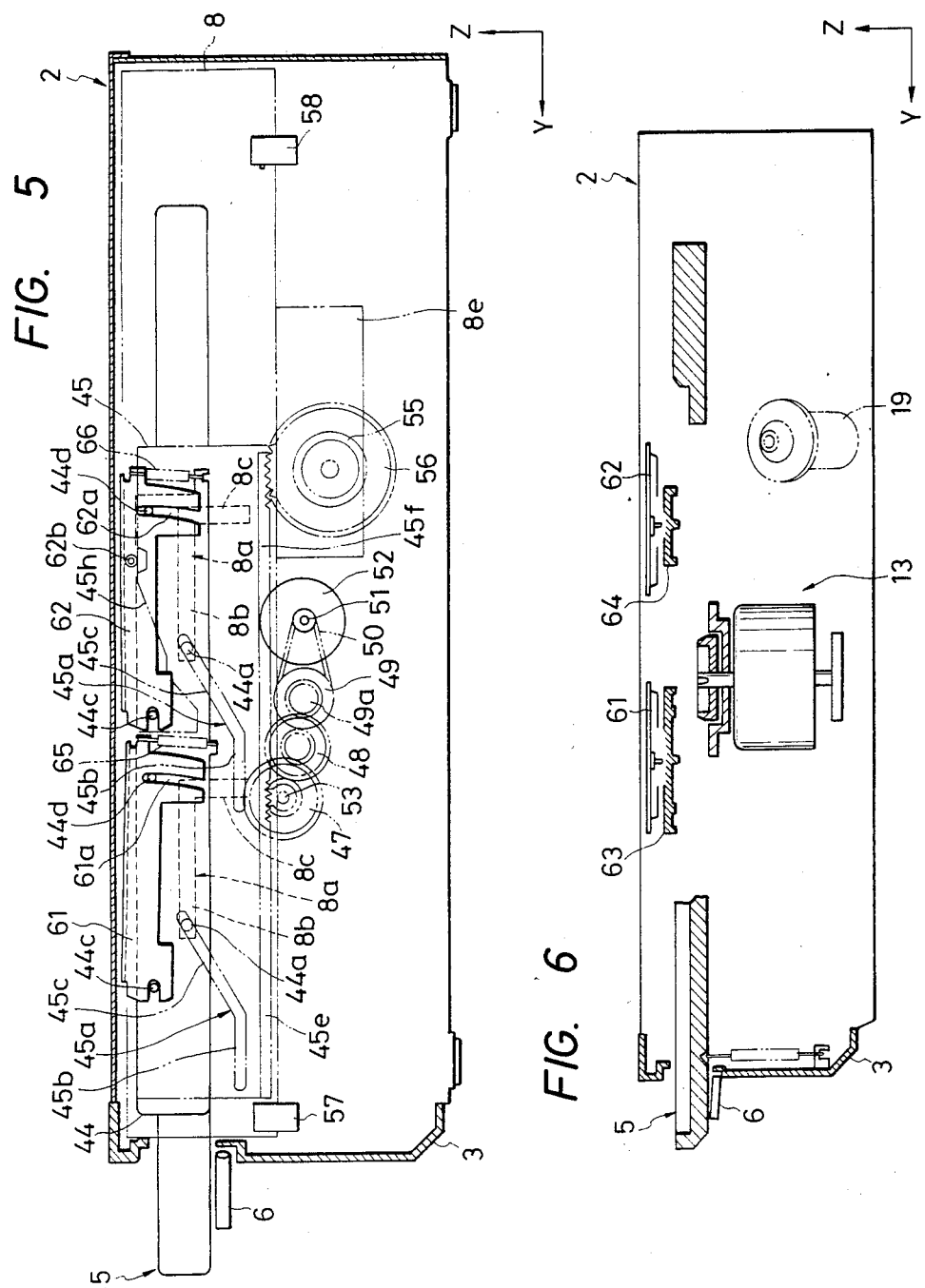

|  | A | B | C | D | E | F | G | H |
|---|---|---|---|---|---|---|---|---|
| $b_0$ | 1 | 0 | 0 | 1 | 1 | 0 | 0 | 1 |
| $b_1$ | 1 | 1 | 0 | 0 | 0 | 0 | 1 | 1 |
| $b_2$ | 1 | 1 | 1 | 1 | 0 | 0 | 0 | 0 |

1→ON
0→OFF

DUAL-SIZED DISK PLAYER

BACKGROUND OF THE INVENTION

1. Field of the Invention

The present invention relates to a disk player, and, more particularly, it relates to a disk player having a disk conveying mechanism for automatically conveying a disk to a play position.

2. Background of the Invention

Heretofore, there have been known disk players for disks such as an audio disk having sound grooves on its surfaces, a digital audio disk for recording PCM signals thereon, or the like. These disk players have a disk conveying mechanism for conveying the disk to a play position while carrying the disk on a carrier capable of being projected out of or accommodated into a player housing. To convey a disk mounted on the disk carrier outside the player housing to a play position, or in other words, to position the disk on the turntable, the disk conveying has been performed by moving the disk in two directions parallel to and perpendicular to the disk carrying surface of the turntable. The disk players of this type generally have position detecting means for detecting the position of the disk in the course of the transport, that is, for detecting the position of the disk carrier. Specifically, the position detecting means include a plurality of detection switches directly or indirectly engaged with the disk carrying tray (carrier) to thereby detect both the position where the disk carrying tray begins to move and the position where the disk carrying tray terminates its movement. Recently, a structure in which the above-described disk conveying mechanism is operated with another mechanism has been often used. Accordingly, in addition to the detection switches, it is necessary to detect the position of the disk carrying tray in the course of movement. However, a problem exists in that the provision of additional detection switches increases cost. Furthermore, general switches vary in timing for the tray positions where the switches turn on or off. Accordingly, it is difficult to detect with high accuracy the position of the disk carrier in the course of movement.

There has been another proposal in which a gear engaged with a rack or the like of the disk conveying mechanism is attached to a potentiometer constituted by a variable resistor. Several comparators each compare a terminal voltage obtained by the rotation of the gear with a reference voltage adjusted and set in advance they are provided so that the change in output of the respective comparator is detected to thereby determine the position on the basis of the detection signal. In the arrangement using the potentiometer, however, as many comparators as the positions required to be detected should be provided. Furthermore, the reference voltage should be adjusted by using a potentiometer or the like, resulting in disadvantages in increased cost and in troublesome work in adjustment.

SUMMARY OF THE INVENTION

The present invention has been attained in view of the points described above. Accordingly, an object of the present invention is to provide a disk player in which the motion of the disk carrier can be detected with high accuracy and which is low in cost.

The disk player according to the present invention includes a housing and playing means disposed within the housing. A disk conveying mechanism includes a disk carrier mechanism capable of projecting out of the housing and for carrying a disk to be played. The disk conveying mechanism is arranged to move the disk in a first predetermined direction and in a second predetermined direction perpendicular to the first predetermined direction to thereby convey the disk to a play position. Position detect means detecting the position of the disk carrier mechanism. The position detecting means has a rotary encoder responsive to the movement of the disk carrying portion and a position discriminating circuit for discriminating the position on the basis of the output signal of the rotary encoder.

BRIEF DESCRIPTION OF THE DRAWINGS

FIGS. 4 and 5 are a plan view and a side view of the inside structure of the disk player.

FIG. 6 is a view for explaining the clamp mechanism.

DETAILED DESCRIPTION OF THE PREFERRED EMBODIMENTS

Figure 1:
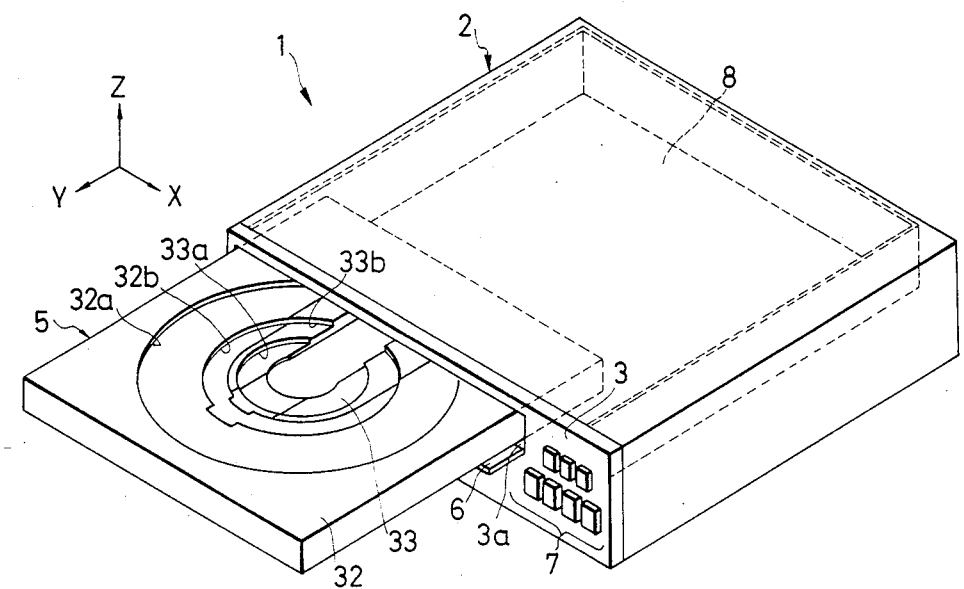
FIG. 1 is a perspective view showing the whole of a disk player according to the present invention.

An embodiment of the disk player according to the present invention will be described in detail with reference to the accompanying drawings. In the drawings, the reference numeral 1 designates the disk player as a whole.

As shown in FIG. 1, a leftwards and rightwards extending rectangular opening 3a is formed in a front portion of a housing 2, or in other words formed in a front panel 3, such that a disk carrying tray 5 can project out of the housing 2. The term "leftwards/rightwards" used herein is referenced to the frontward direction expressed by the arrow Y. Accordingly, the arrow X expresses the leftward direction. The arrow Z expresses the upward direction. A door 6 for selectively blocking up the opening 3a is provided in the vicinity of the opening 3a. A group of switches 7 for operating the disk player 1 are provided on the front panel 3.

Figure 2:
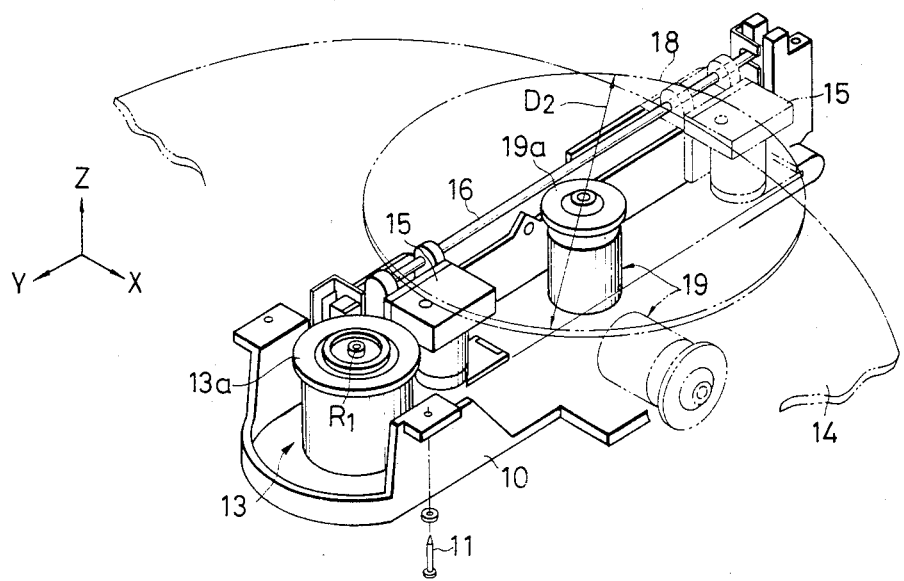
FIG. 2 is a perspective view of spindle motors and their peripheral members.

A chassis 8 provided within the housing 2. A base member 10 shown in FIG. 2 is fixed to a required position of the lower surface of the chassis 8 by screws 11 or the like. The base member 10 and the screws 11 or the like are generally called the "supporting mechanism". A first spindle motor 13 is fixed to a front end portion of the base member 10. The first spindle motor 13 rotationally drives an optical video disk 14 with a diameter of about 20 or 30 cm and the motor 13 is suitable for high-load and high-speed rotation. A carriage 15 for carrying optical pickup means is arranged at the rear of the first spindle motor 13 and is guided by a guide shaft 16 provided on the base member 10 so that the carriage 15 can move along a plane containing a disk carrying surface 13a of the first spindle motor 13.

Furthermore, a second spindle motor 19 for rotationally driving a compact disk 18 with a diameter of about 12 cm is provided on the base member 10. The second spindle motor 19 is movable between a first position shown by the solid line of FIG. 2 and a perpendicular and lower second position shown by the two-dotted chain line of FIG. 2. The first position is a position where the disk carrying surface 19a of the second spindle motor and the disk carrying surface 13a of the first spindle motor 13 are approximately in one plane and where the distance between the rotational axes of the first and second spindle motors 13 and 19 is larger than the sum of the radius $D_2/2$ of the compact disk 18 to be carried and the radius $R_1$ of the disk carrying surface 13 of the first spindle motor 13. $D_2$ represents the diameter of the compact disk 18. That is, the second spindle motor 19 is arranged so that the circumference of the compact disk 18 mounted on the second spindle motor 19 being at the first position is not in contact with the first spindle motor 13. The second position is a position where the disk carrying surface 19a of the second spindle motor is separated from the plane containing the disk carrying surface 13a of the spindle motor 13 and from the trajectory of the carriage 15. The second position is not limited to be lower as in the drawing, but may be in the plane containing the disk carrying surface 13a of the first spindle motor 13 as long as it is out of the diameter of the optical video disk 14 mounted on the first spindle motor 13. It is apparent from the drawing that the movement of the second spindle motor 19 is made by changing the direction of the rotational axis of the second spindle motor. The second position is under the plane containing the disk carrying surface 13a of the first spindle motor 13 and at a side of the trajectory of the carriage 15. Other mechanisms do not exist in this location and, accordingly, a so-called dead space can be effectively used for the second position. Accordingly, small-sized disk players as a whole and, more particularly, small-sized or thin disk players in the direction of the arrow Z can be easily manufactured. The second position may be established to be under the plane containing the disk carrying surface 13a of the first spindle motor 13 and the trajectory of the carriage 15. In this case, miniaturization of the disk player in the direction of the arrow X or the arrow Y can be easily achieved. Although the second position shown in the drawings is established so that the direction of the rotational axis of the second spindle motor 19 is at right angles to both the disk carrying surface 13a of the first spindle motor 13 and the direction of movement of the carriage 15 so as to approximately conform with the direction of the arrow X, the second position may be established so that the direction of the rotational axis thereof accords with the direction of the arrow Y.

Figure 3A:
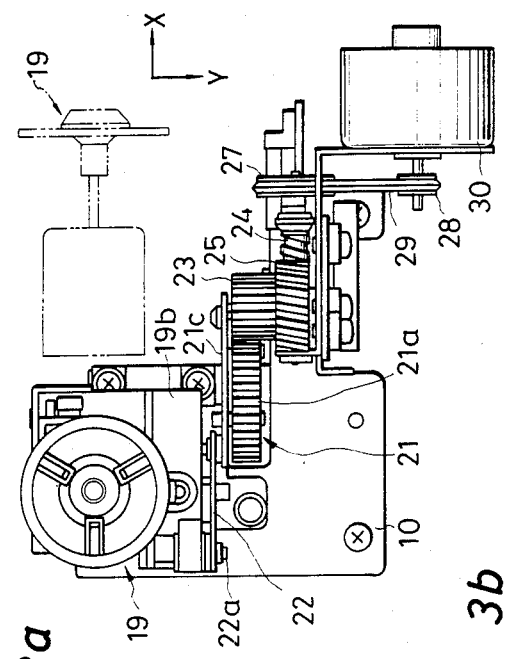
FIGS. 3a to 3c are a plan view, a front view and a left side view of the second spindle motor and its peripheral members.
Figure 3B:
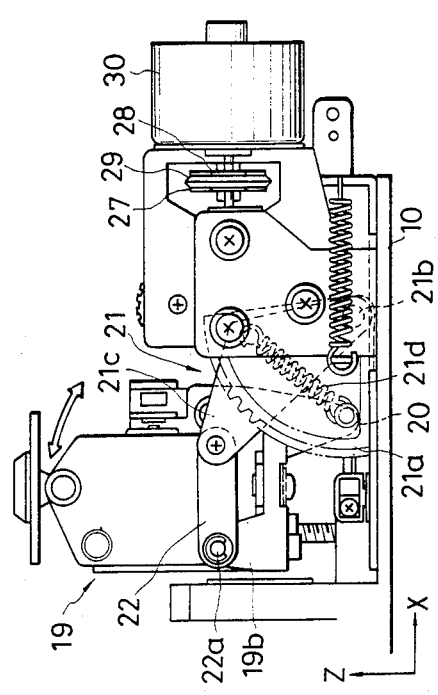
Figure 3C:
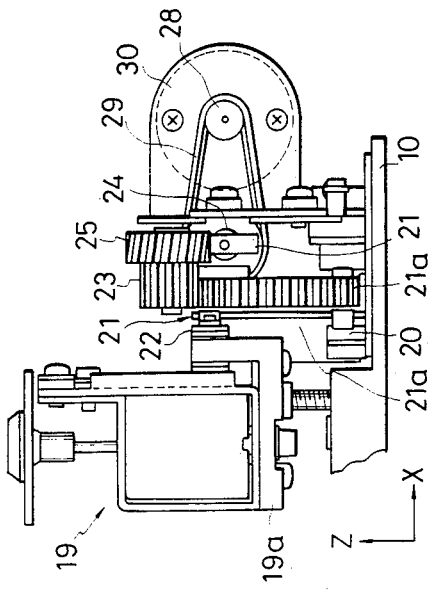

Means for moving the second spindle motor 19 will be described in detail with reference to FIGS. 3a to 3c. As shown in the drawings, the second spindle motor 19 has a leg member 19b, and is rotatably mounted on the base member 10 through a support pin at the top end portion of the leg member 19b. A sector gear 21 is provided in the vicinity of the second spindle motor 19. The sector gear 21 is constituted by a gear body 21a, an intermediate member 21c provided independently of the gear body 21a so as to be concentrically rotatable on the axis 21b of the gear body 21a, and a coiled spring 21d as a spring member interposed between the gear body and the intermediate member to connect the two. A lever member 22 has one end portion rotatably attached to a rotary end portion of the intermediate member 21c which is a constituent member of the sector gear 21, and the other end portion pivoted to a free end portion of the second spindle motor 19 through a pin 22a. The gear body 21a of the sector gear 21 engages with a gear 23. The gear 23 is integrally molded with a worm wheel 25 which engages with a worm 24. The worm 24 is connected to the power shaft of a motor 30 through a pair of pulleys 27 and 28 and a belt 29. Rotational power transmission means for transmitting rotational power to the sector gear 21 are made up of the gear 23, the worm 24, the worm wheel 25, the pulleys 27 and 28, the belt 29 and the motor 30. Moving means for the rotational movement of the second spindle motor 19 are made up of the rotational power transmission means, the sector gear 21, the lever member 22 and the like.

Disk playing means are made up of the moving means, the first and second spindle motors 13 and 19, the supporting mechanism including the base member 10 for supporting the two spindle motors, the carriage 15 including the optical pickup means, and attendant small members relevant thereto.

Figure 4:
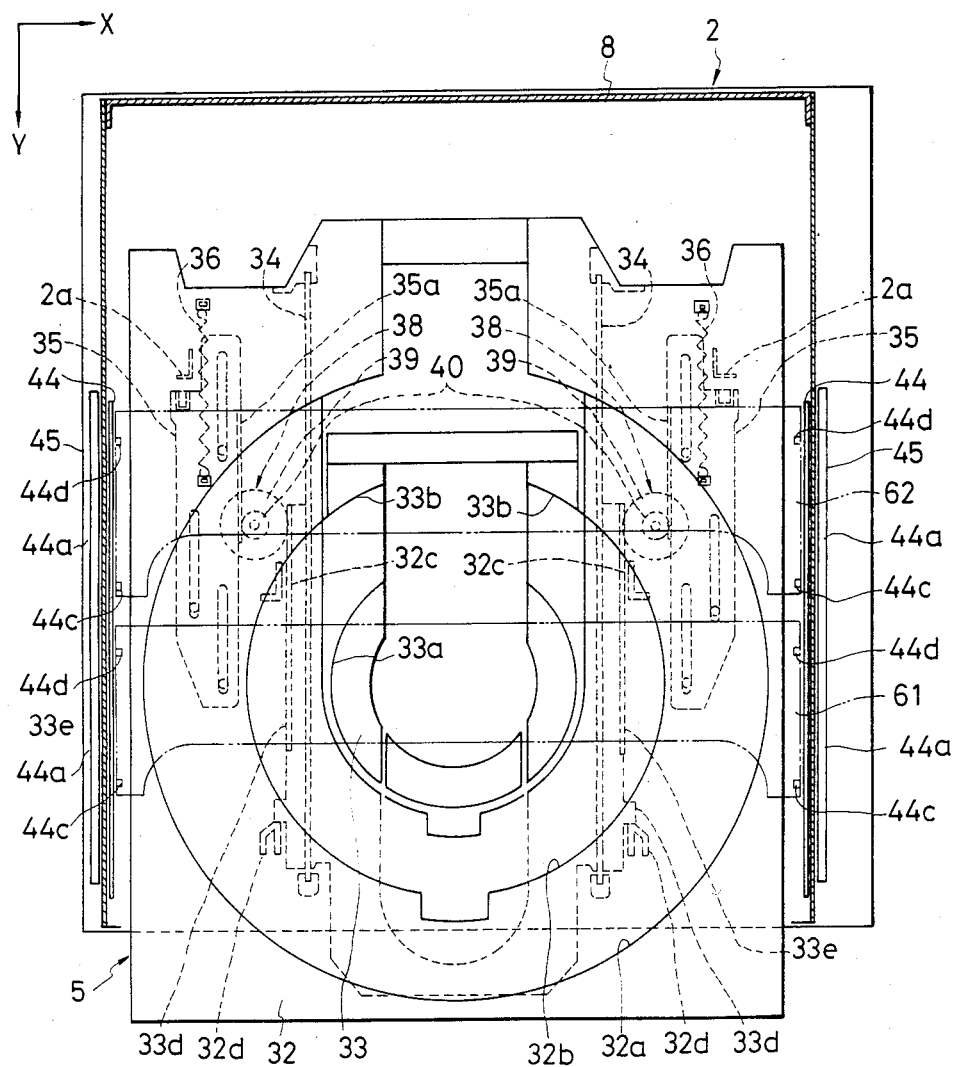
Figure 7A:
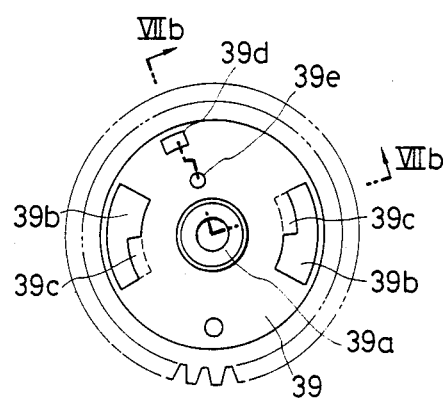
FIGS. 7a to 9 are partial detailed views of the inside structure thereof.
Figure 8A:
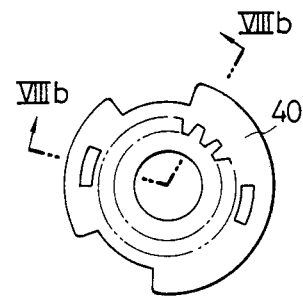
Figure 7B:
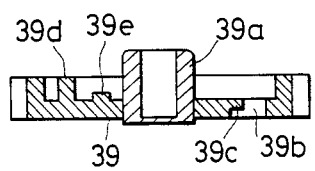
Figure 8B:
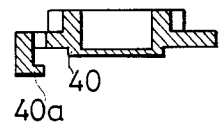
Figure 7C:
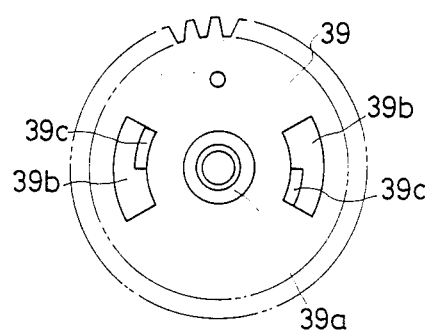
Figure 8C:
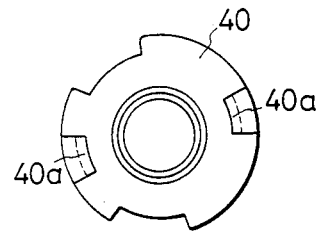

In the following, the disk conveying mechanism including the disk carrying tray 5 and provided for conveying a disk to be played to a play position is described in detail. As shown in FIGS. 1 and 4, the disk carrier tray 5 has a first carrier 32 for carrying an optical video disk 14 to be mounted on the first spindle motor 13 and a separately movable second carrier 33 for carrying a compact disk 18 to be mounted on the second spindle motor 19. Two circular shallow concavities 32a and 32b are concentrically formed in the upper surface of the first carrier 32 so as to insert about 30 cm- and 20 cm- diameter optical video disks therein. A smaller circular concavity 33a capable of containing the compact disk 18 therein and a portion 33b which is a continuation of the circular concavity 32b for the 20 cm-diameter optical disk provided on the first carrier 32 and formed in the upper surface of the second carrier 33.

A pair of left and right guide shafts 34 (FIG. 4) are provided at the lower portion of the first carrier plate 32 so that the guide shafts 34 extend frontwards and backwards (in the direction of the arrow Y and in the reverse direction) in a plane parallel to the disk carrying surface 13a of the first spindle motor 13. The second carrier 33 is slidably movably mounted to the two guide shafts. FIGS. 1 and 4 show the condition before the movement of the second carrier 33. In this condition, the circular concavity 33a formed in the second carrier 33 for insertion of the compact disk is concentrically arranged with respect to the circular concavities 32a and 32b provided in the first carrier 32 for insertion of the optical video disks. A pair of protrusions 33d are provided at the left and right sides of the second carrier 33. By fitting the protrusions 33d to two pairs of stoppers 32d and 32e provided at the lower surface of the first carrier 32, the movement of the second carrier 33 relative to the first carrier 32 is limited within a predetermined range.

It is apparent from FIG. 4 that a pair of slide member 35 extending frontwards and backwards are provided on the lower surface of the first carrier 32 so as to put the second carrier 33 therebetween. The two slide member 35 are reciprocally movable frontwards and backwards relative to the first carrier 32 within a predetermined range. Coiled springs 36 are attached between the first carrier 32 at their respective one end portions and the two slide members 35 at their respective other ends. The two slide member 35 are biased backwards (in the direction opposite to the arrow Y) by the coiled springs 36. Each slide member 35 is provided with a rack portion 35a formed along its moving direction and at its one side with respect to its moving direction. Gears 38 provided at the lower portion of the first carrier 32 engage with the respective rack portions 35a. The respective gear 38 is composed of a large gear 39 and a small gear 40 which are formed concentrically with each other. The respective small gears 40 engage with the rack portions 35a. The respective large gears 39 engage with other rack portions 33e provided at the left and right sides of the second carrier 33 corresponding to the directly above-mentioned rack portions 35, respectively.

On the other hand, as shown in FIG. 4, L-shaped stoppers 2a capable of being in contact with the rear end portions of the slide members 35 are provided at predetermined positions within the housing 2. Accordingly, when the disk carrying tray 5 moves backwards, the rear end portions of the slide members 35 come into contact with the stoppers 2a. When the disk carrying tray 5 in this condition moves more backwards, the second carrier 33 moves backwards relative to the first carrier 32.

Figure 9:
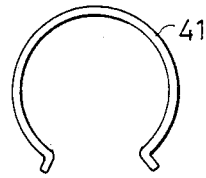

FIGS. 7a to 9 separately show constituent members of the gear 38 interposed between the respective slide member 35 and the second carrier 33. As shown in the drawings, the large gear 39 which is one of the constituent members of the gear 38 is provided with a boss 39a and the small gear 40 is rotatably fitted to the boss 39a. A pair of hooks 40a are formed at a main surface of the small gear 40 and inserted into a pair of sector openings 39b formed in the large gear 39 corresponding to the hooks 40a to thereby make the small gear 40 rotatable within a predetermined range relative to the large gear 39. Collars 39c are provided inside the sector openings 39b and the hooks 40a are fitted with the collars 39c to thereby prevent the dropout of the small gear 40 with respect to the large gear 39. A ring spring 41, shown in FIG. 9, is interposed between the large gear 39 and the small gear 40. One end portion of the ring spring 41 is attached to a portion between two protrusions 39d and 39e provided at the main surface of the large gear 39 and the other end portion of the ring spring 41 is engaged by the hook 40a. In short, the large gear 39 and the small gear 40 are connected to each other through the elastic force of the ring spring 41. Accordingly, the two gears rotate relatively when rotational power exceeding a predetermined degree is applied to the two gears. It is apparent from the aforementioned construction that, when the disk carrying tray 5 projects out of the housing 2, the biasing force of the coiled spring 36 is transmitted to the second carrier 33 through the slide member 35 and the gear 38 to thereby return the second carrier to the position shown in FIG. 4.

A carrier moving mechanism for moving the second carrier 33 relative to the first carrier 32 corresponding to the projecting and retracting operation of the disk carrying tray 5 with respect to the housing 2 is made up of the slide members 35, the gears 38, the rack portions 33e formed at the second carrier 33, and the coiled springs 36 acting as bias force application means.

By suitably determining the position of the stoppers 2a provided within the housing 2 so as to be in contact with the rear end portion of the slide member 35, the backward movement of the second carrier 33 relative to the first carrier 32 can be established to be started after the backward operation of the disk carrying portion 5 is started. Although the disk carrying tray 5 is manually pushed within the housing 2 from the projecting position shown in FIG. 1 to the position shown in FIG. 4 and then the disk carrying tray 5 is entirely housed in the housing by a driving mechanism as described later, there unavoidably arises a bad influence on the members, such as the second carrier 33 and the like, owing to unreasonable force produced by the manual operation as the result of the establishment of the starting timing with respect to the backward movement of the second carrier 33 as described above.

Although this embodiment shows the case where the position of the second carrier 33 is approximately at the center of the disk carrying tray 5 when the disk carrying tray 5 projects out of the housing 2, that is, when the disk begins to be carried on the disk carrying tray 5, the invention is applicable to the case where the position of the second carrier 33 in this condition is in the vicinity of the projecting end of the disk carrying portion. In the latter case, it is unnecessary to pull the disk carrying tray 5 far out of the housing 2 when the compact disk 18 is carried on the second carrier 33. Accordingly, the handling property can be improved.

As shown in FIGS. 4 and 5, a pair of rectangular plate-like supporting members 44 are provided so as to surround the disk carrying tray 5 on both the right and left sides. The disk carrying tray 5 is supported by the pair of supporting members 44 so as to be movable in a direction parallel to the disk carrying surface 13a of the first spindle motor 13 or in other words movable frontwards and backwards in the drawings (in the direction of the arrow Y and the direction opposite thereto). It is apparent from FIG. 5 that a pair of pins 44a separated in the frontward/backward direction are provided on the outer surfaces of the supporting members 44 and are movably inserted into L-shaped guide holes 8a formed in the chassis 8. Accordingly, the supporting members 44 are movable along the L-shaped guide holes 8a. Each L-shaped guide hole 8a is composed of a parallel portion 8b extending in parallel to the disk carrying surface 13a of the first spindle motor 13 and a perpendicular portion 8c continued from the rear end of the parallel portion 8b and extending perpendicularly to the disk carrying surface 13a. A pair of left and right rectangular moving members 45 are provided so that the L-shaped guide hole 8a is put between the respective moving member 45 and the supporting member 44. The respective moving members 45 are mounted onto the chassis 8 so as to be movable in the frontward and backward directions (in the direction of the arrow Y and in the direction opposite thereto). A pair of pins 44a provided on the respective supporting members 44 are respectively slidably engaged with cam holes 45a formed in the respective moving members 45 through the L-shaped guide holes 8a of the chassis 8. Each cam hole 45a is composed of a parallel portion 45b extending in parallel to the disk carrying surface 13a of the first spindle motor 13 (in this embodiment, extending frontwards and backwards) and an inclined portion 45c continued to the rear end of the parallel portion 45b and inclined upwards (in the direction of the arrow Z) with respect to the backward direction (opposite to the arrow Y). In other words, the cam hole 45a is formed so that, when the respective moving member 45 moves frontwards and backwards with respect to the supporting member 44, the supporting member 44 and the disk carrying tray 5 supported by the supporting member 44 move upwards and downwards, that is, move vertically relative to the disk carrying surface 13a of the first spindle motor 13.

It is apparent from FIG. 5 that rack portions 45e are provided at the lower end portions of the pair of moving member 45 and that the rack portion 45e of one of the moving member 45 is engaged with a rack gear 47. The rack gear 47 is connected to the power shaft of a motor 52 via another gear 48 engaged with the rack gear 47, a pulley 49 having a gear portion 49a engaged with the other gear 48, a belt 50 and a small pulley 51. The rack gear 47 is fitted to one end of a shaft 53, the other end of this shaft 53 extending to the vicinity of the other moving member 45. A gear, not shown, engaged with the rack portion 45e formed at the other moving member 45 is fitted to the other end of this shaft 53. Accordingly, the pair of left and right moving members 45 are moved in synchronism with each other by the rotation of the rack gear 47.

Driving means for synchronously driving the pair of moving members are made up of the gears 47 and 48, the pulley 49, the belt 50, the small pulley 51, the motor 52, the shaft 53 and the like. Furthermore, driving means for driving the disk carrying portion 5 are made up of the driving means, the supporting members 44, the pair of moving members 45, the L-shaped guide holes 8a of the chassis 8, and peripheral small member relevant thereto.

Locking means, not shown, are provided to lock the disk carrying tray 5 with respect to the supporting members 44 when the disk carrying tray 5 is moved backwards into the housing and reaches its limit position with respect to the supporting members 44. Furthermore, locking and unlocking means are provided to move the supporting member 44 together with the moving member 45 in the direction of retracting the disk carrying. By the locking and unlocking means, the supporting member 44 is locked with respect to the moving member 45 till the pin 44a of the supporting member 44 reaches an intersection of the parallel portion 8b and the perpendicular portion 8c of the L-shaped guide hole 8a. The supporting member is unlocked after the pin 4a reaches the intersection but the supporting member 44 is locked in the retracting direction with respect to the chassis 8.

A disk conveying mechanism for conveying a disk to be played at a play position on the respective spindle motor 13 or 19 is made up of a carrier moving mechanism (as described above) including the locking means, the locking/unlocking means, the disk carrying tray 5, the slide member 35 and the like, and driving means (as described above) including the chassis 8, the moving members 45 and the like, and peripheral small members relevant thereto.

As shown in FIG. 5, at the lower end of the moving member 45, another rack portion 45f is formed in the rear of the rack portion 45e. The rack portion 45f is engaged with a rack gear 56 for operating a rotary encoder 55. The rotary encoder 55 is constructed to generate ON/OFF signals owing to the contact between a plurality of contacts or brushes mounted to a shaft and a copper foil of a printed substrate, so that the rotational angle can be detected owing to the combination of ON/OFF signals from the output terminal of the encoder 55. According to such a construction, the linear displacement of the moving member 45 is converted into the rotational replacement thereof.

Figures 19, 20:
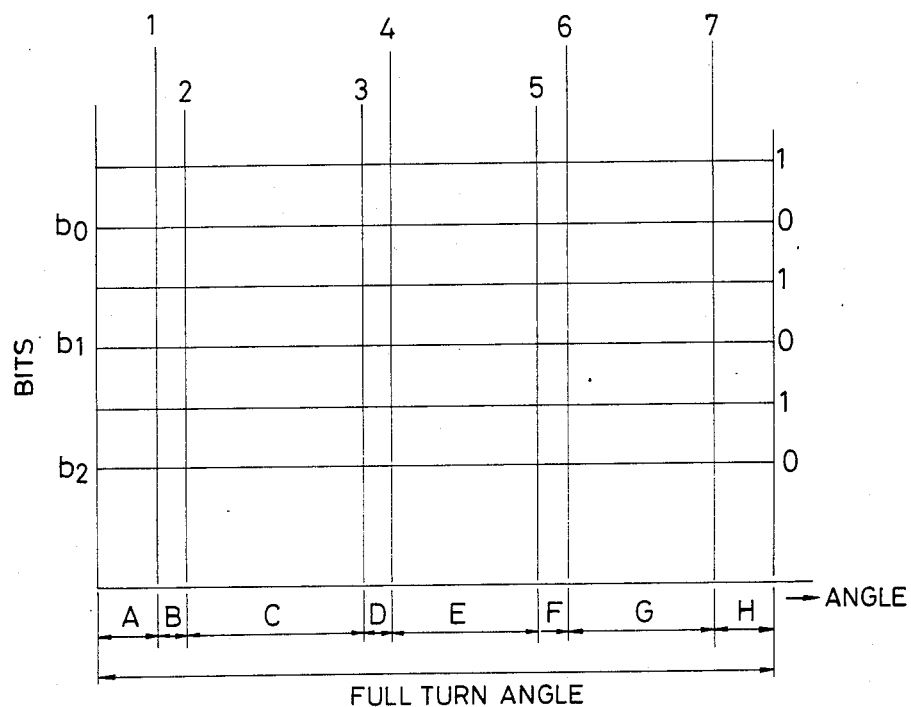
FIG. 19 is a timing chart of the output waveform of the rotary encoder.
FIG. 20 is a bit code table of the output of the rotary encoder.

FIG. 19 is a timing chart of the output waveform of the rotary encoder 55. This embodiment uses a three-bit output, so that $2^3=8$ modes of positions can be constructed. In the drawing, the respective positions 1, 4, 6 and 7 correspond to the positions where four respective mechanisms operate. Each of the positions represents a pulse-drive starting position for improving the accuracy in stoppage of the moving member 45 at the loading-out finishing position (the position 1). The positions 3 and 5 represent pulse-drive starting positions for improving the accuracy in stoppage of the moving member respectively at the position after movement and at the play position represented by positions 4 and 6. FIG. 20 is a bit code table of the output of the rotary encoder 55, and more particularly, is an output code table of three bits $b_0$, $b_1$ and $b_2$ in the case where the total angle of the rotary encoder is divided into eight modes of from A to H corresponding to the aforementioned seven positions.

According to such a construction, the bit output of the rotary encoder 55 rotated with the rack 45f can be discriminated by a position discriminating circuit in a microcomputer or the like to thereby make it possible to determine the aforementioned four stop positions or the current position of the moving member. Furthermore, the timing of the pulse-drive starting point of the motor can be detected to thereby make it possible to perform a necessary operation. Although a three-bit rotary encoder is used in this embodiment, the output bits may be suitably increased in number corresponding to the number of detection points if necessary. Particularly in the rotary encoder 55 used in this embodiment, the number of bits can be easily changed simply by the addition of more contacts or brushes. Accordingly, the rotary encoder 55 is applicable to various types of machines with low cost.

As shown in FIG. 5, a pair of detection switches 57 and 58 are mounted at the front and back ends of the chassis 8. The switches 57 and 58 detect the movement starting position and the movement terminating position of the moving member 45 by engagement with the front end portion and the rear end portion of the moving member 45. Thereby the movement starting position and the movement terminating position of the disk carrying tray 5 are detected. Position detecting means for detecting the position of the disk carrying tray 5 are made up of the rotary encoder 55, the detection switches 57 and 58, and the like.

Although the position detection of the moving member 45, that is, the position detection of the disk carrying tray 5, can be made solely by the rotary encoder 55, the use of the detection switches 57 and 58 makes it possible to improve the accuracy in the position detection of the disk carrying tray 5 and to simplify the construction of the control circuit. Although the rack gear 56 for operating the encoder potentiometer 55 is engaged with the rack portion 45f of the moving member 45, the position of the encoder gear may be changed so that the encoder gear is engaged with the rack gear 47 or the other gear 48.

In the following, a clamping mechanism for clamping the disk conveyed to the play position is described in detail.

As shown in FIGS. 4 and 5, a pair of substantially rectangular plate-like retaining members 61 and 62 are disposed at each side within the housing 2. The retaining members 61 and 62 are longitudinally separated and extend transversely. Each retaining member 61 and 62 is rockably mounted on the supporting member 44 through a pin 44c at its front end portion. The rocking direction of the respective retaining member 61 or 62 is approximately perpendicular to the disk carrying surface 13a of the first spindle motor 13. However, an arc-like notch 61a or 62a formed at the rear end portion of the respective retaining member 61 or 62 is fitted to another pin 44d provided at the supporting member 45 with a slight gap. As a result, the downward rocking of the retaining members 61 and 62 is controlled within a fixed limit and the respective retaining member can be rocked on the pin 44c as a fulcrum. As shown in FIG. 6, disk-like first and second pushing members 63 and 64 are respectively rotatably mounted on the lower surfaces of the retaining members 61 and 62. The pushing members 63 and 64 respectively cooperate with the first and second spindle motors 13 and 19 in performing a disk clamping function. As shown in FIG. 5, coiled springs 65 and 66 are respectively connected to the rear end portions of the retaining members 61 and 62. The coiled springs respectively give the retaining members 61 and 62 force in the direction such that the first and second pushing members 63 and 64 respectively approach the first and second spindle motors 13 and 19.

As shown in FIG. 5, a roller 62b is provided at a side end portion of the rear retaining member 62 and the roller 62b is engaged with the timing cam portion 45h formed at the upper end portion of the moving member 45. By suitably establishing the shape of the timing cam portion 45h, the shape of the cam hole 45a provided on the moving member 45 and the moved distance of the moving member 45, the timing for contact and separation of the first and second pushing members 63 and 64 with and from the first and second spindle motors 13 and 19 respectively can be established. In short, the contact and separation of the first and second pushing members 63 and 64 with and from the first and second spindle motors 13 and 19 respectively is independently established. It is apparent from the above description that there is not provided any specific driving source for moving the first and second pushing members 63 and 64 together with the retaining members 61 and 62 and that the driving operation is made by driving power owing to the disk conveying mechanism.

A clamping mechanism for clamping disks conveyed onto respective play positions, that is, conveyed onto the respective spindle motors 13 and 19 corresponding to the disks, is made up of the first and second pushing members 63 and 64, the retaining members 61 and 62 for retaining the pushing members, the coiled springs 65 and 66 acting as energizing means, and the like.

In the following, the operation of the player having such a construction is briefly described with reference to FIGS. 10 through 16 in accordance with the playing procedure.

First, the case where an optical video disk 14 (see FIG. 2) is to be played is described. As shown in FIG. 1, the disk carrying tray 5 is pulled so as to entirely project out of the housing 2 and the optical video disk is mounted on a predetermined place of the disk carrying tray 5. The operation of projecting the disk carrying tray 5 out of the housing 2 is made in the reverse order to the operation of retracting the disk carrying tray 5 into the housing 5 as described later. Therefore, a detailed description will be omitted.

Figure 10:
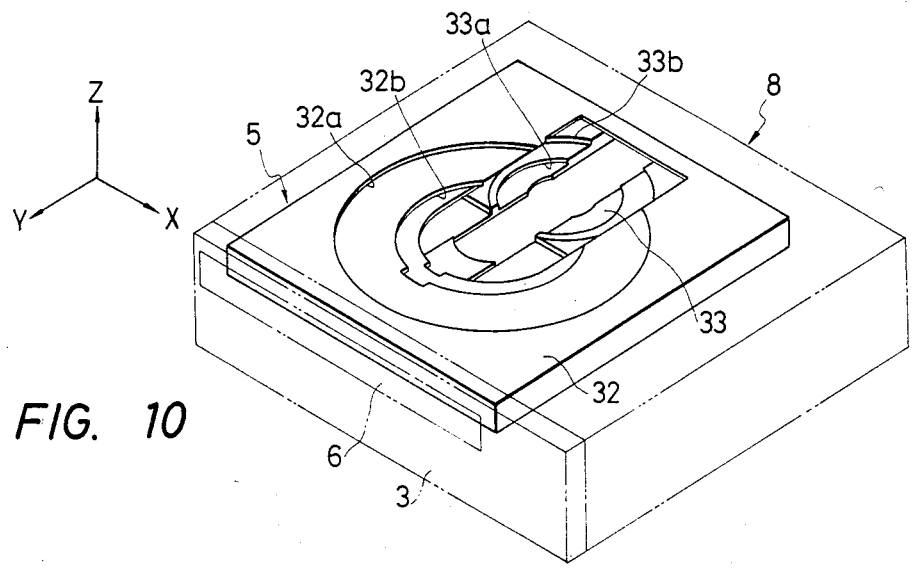
FIGS. 10 to 16 are views for explaining the operation of the disk player.
Figure 11:
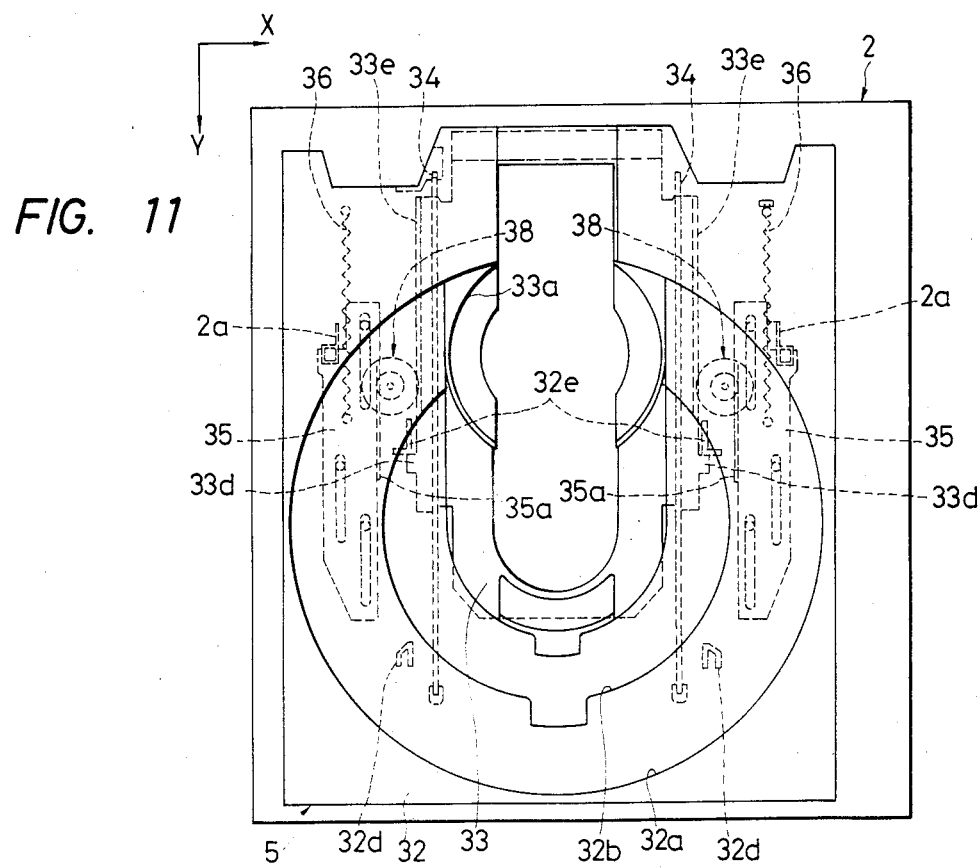
Figure 12:
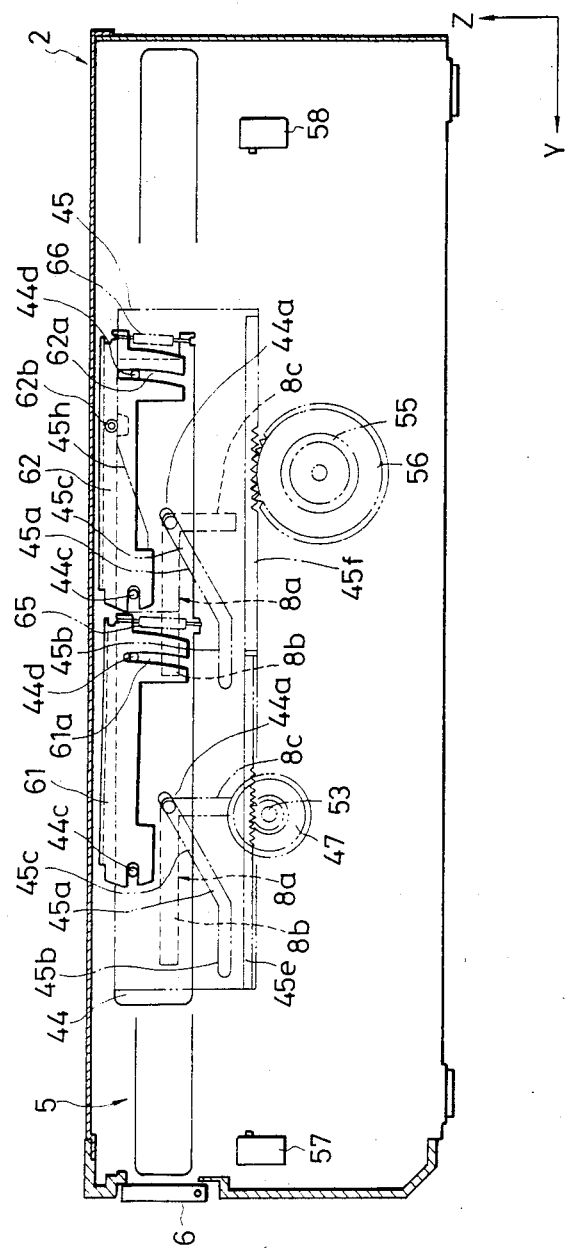

After the optical video disk is mounted on the disk carrying tray 5, the disk carrying tray 5 is manually pushed to the position shown in FIGS. 4 to 6 within the housing 2. When the disk carrying tray 5 reaches this position, a predetermined detection switch operates. Thus, the motor 52 shown in FIG. 5 begins to rotate. At this time, the disk carrying tray 5 is turned to the locked state with respect to the supporting member 44 by the locking means, so that the disk carrying tray 5 is integrally pulled into the housing. Accordingly, the disk carrying tray 5 moves backwards (in the direction opposite to the arrow Y) and is entirely accommodated in the housing 2. As shown in FIGS. 10 and 11, the second carrier 33 is moved to the position which corresponds to the second spindle motor 19. At this time, the diameter of the disk to be played is discriminated by discriminating means not shown.

Figure 13:
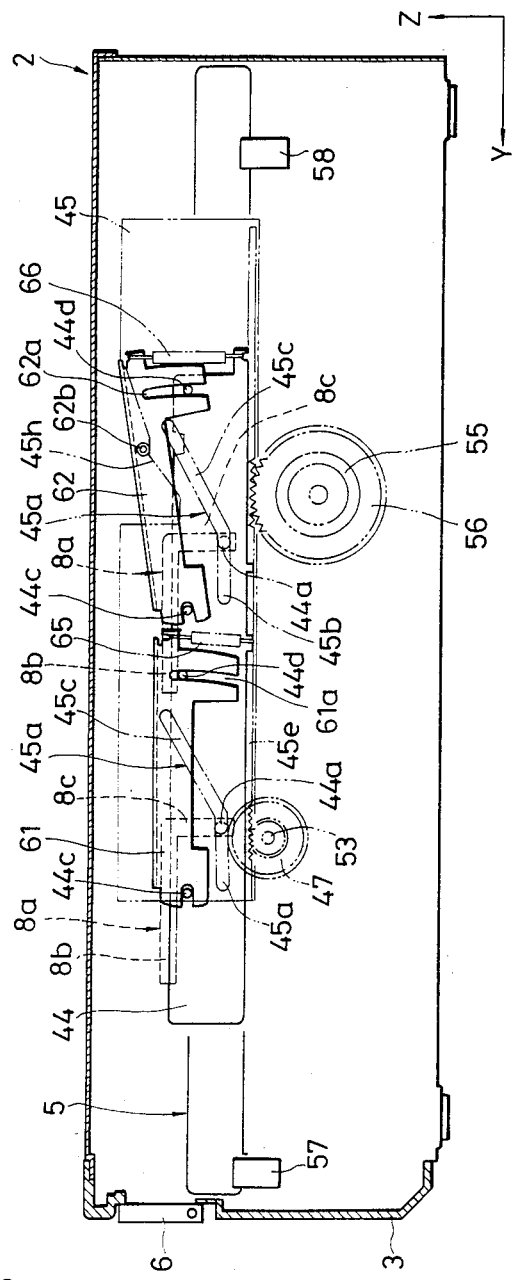
Figure 14:
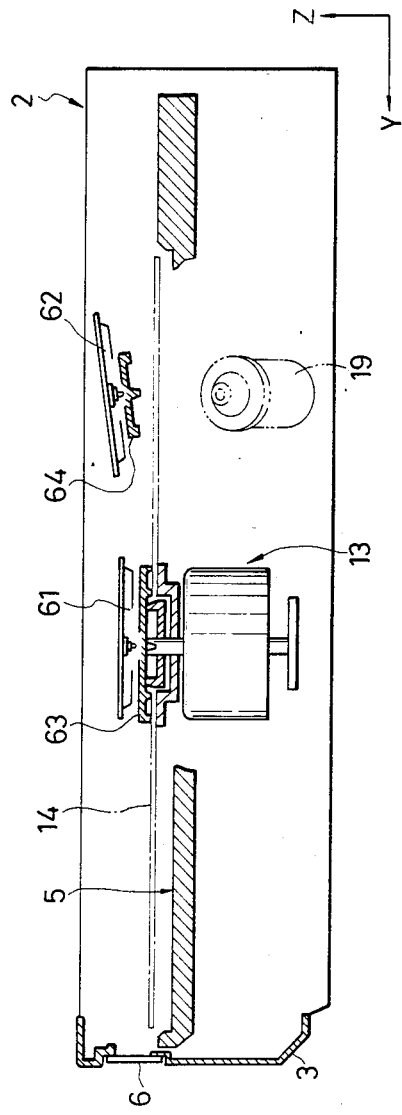
Figure 15:
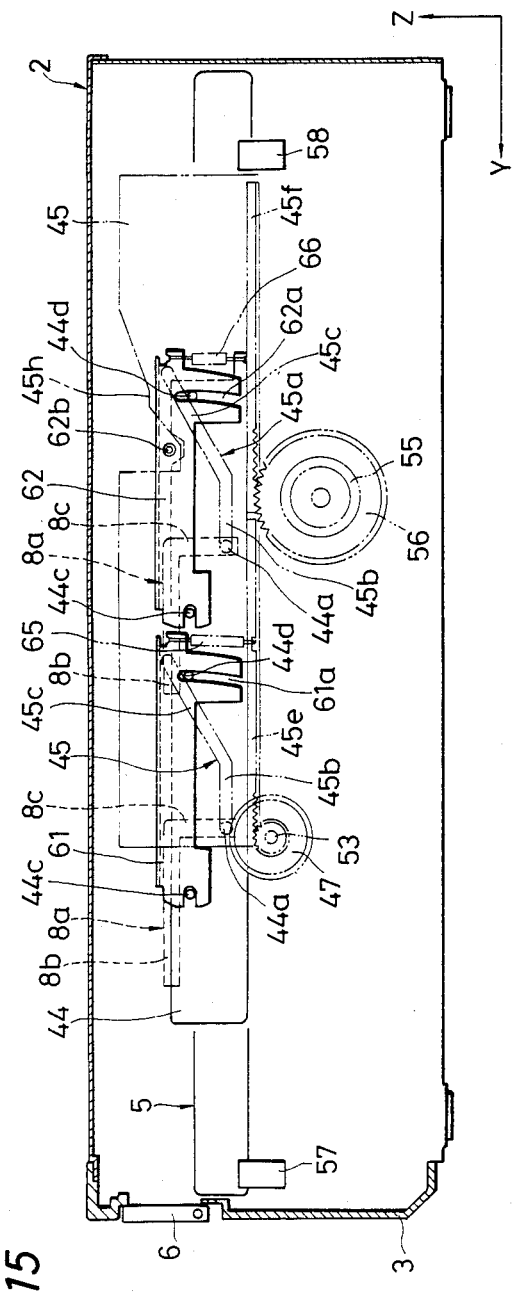

If judgement proves that the conveyed disk 14 is an optical video disk, the moving member 45 is moved further backwards by a predetermined distance as shown in FIG. 13. Accordingly, the disk carrying tray 5 descends together with the supporting member 44. Then, the optical video disk 14 is mounted onto the first spindle motor 13 and clamped as shown in FIG. 14. In this condition the motor 52 stops to thereby enable disk playing.

Upon the completion of the loading of the optical video disk 14, the first spindle motor 13 rotates so that the carriage 15 (see FIG. 2) begins to operate. Thus, the disk playing operation starts.

When the detection switch (not shown) detects the carriage 15 reaching its limit position after the completion of playing, the carriage 15 and the first spindle motor 13 stop. At the same time, the motor 52 begins to rotate in reverse. Accordingly, as described above, the disk carrying tray 5 returns in the reversed course and projects out of the housing 2 so that the locked state thereof is released. Accordingly, the disk carrying tray 5 becomes freely movable frontwards and backwards with respect to the supporting member 44 so that the condition as shown in FIGS. 4 to 6 is established. Thereafter, the disk carrying tray 5 is manually pulled out to take out the optical video disk 14.

Figure 16:
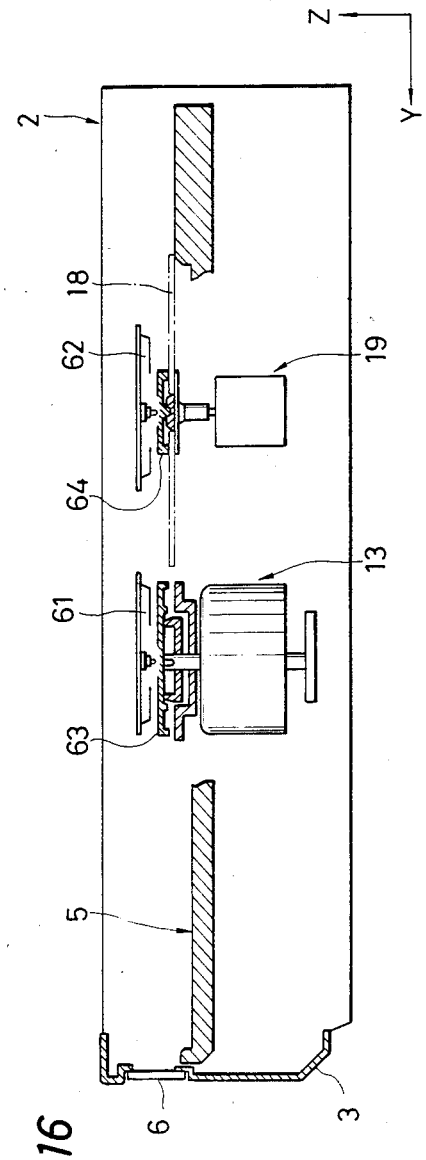
Figure 17A:
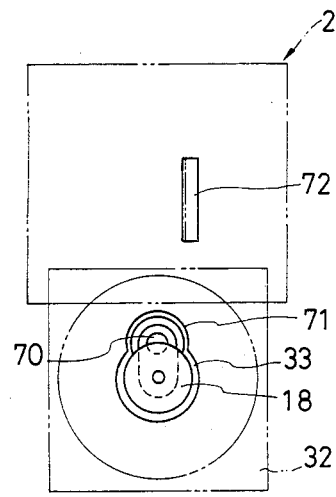
FIGS. 17a, 17b, 18a and 18b are views showing modifications of the disk player.
Figure 17B:
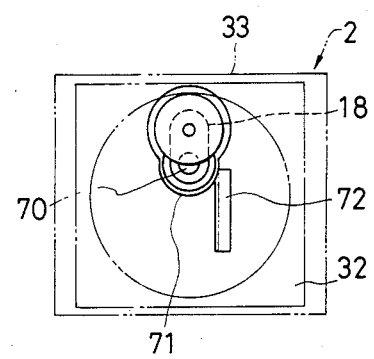
Figure 18A:
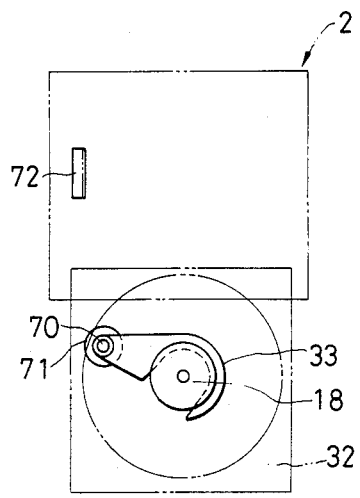
Figure 18B:
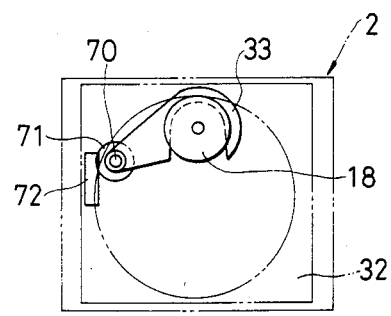

The case where the disk to be played is a compact disk 18 (see FIG. 2) is now described. The operation of the disk conveying mechanism from the start to the condition shown in FIG. 14 is made in the same manner as in the case of the optical video disk 14. If judgement proves that the conveyed disk is a compact disk 18, the moving member 45 is moved further backwards than the position of FIG. 13 until it reaches the position of FIG. 15. Accordingly, the compact disk 18 is clamped on the second spindle motor 19 as shown in FIG. 16. The movement of the second spindle motor 19 as shown in FIG. 16 is made in accordance with the signal from the discriminating means.

Although the disk player is so constructed that the movement of the second carrier 33 for carrying the compact disk 18 with respect to the first carrier 32 is made by a linear reciprocating motion, the disk player may be constructed, as shown alternatively in FIGS. 17a and 17b and FIGS. 18a and 18b, so that the second carrier 33 is used as a member horizontally rocking with respect to a support shaft 70 and so that a gear 71 and a rack member 72 are added thereto to drive the second carrier 33.

In the disk player, in the case where the optical video disk 14 is to be clamped, the second pushing member 64 for compact disk is in the clamp-releasing position. On the other hand, when the second pushing member 64 is in the clamping position, the first pushing member 63 for optical video disk 14 is also set into the clamping position. However, the invention is not limited to this construction. For example, a timing cam portion corresponding to the first pushing member may be provided in the moving member 45 (though the timing cam portion 45h is provided corresponding to the second pushing member 64). In this case, the first pushing member 63 can be moved to the clamp-releasing position when the compact disk 18 is to be clamped.

As described above in detail, in the disk player according to the present invention, the position detecting means for detecting the position of the disk carrying portion for carrying a disk to be played thereon and for conveying the disk into a play position has a rotary encoder operated in response to the movement of the disk carrying portion and has a position discriminating circuit for discriminating the position on the basis of the output signal of the rotary encoder.

Accordingly, the position of the disk carrying tray in motion can be detected with high accuracy, and cost can be easily saved because cost little increases even if the number of detection places increases and because, as an example, only one detecting means can be used.

What is claimed is:

1. A disk player comprising:
  a supporting mechanism;
  a first spindle motor fixedly mounted on said supporting mechanism and having a disk carrying surface;
  a carriage for carrying pickup means for a disk and arranged to move parallel to a plane containing said disk carrying surface of said first spindle motor;
  a second spindle motor having a disk carrying surface and arranged to move between a first position where said disk carrying surface of said second spindle motor is located substantially in the same plane as the disk carrying surface of said first spindle motor and a second position where the disk carrying surface of said second spindle motor is separated by a predetermined distance from the plane containing said disk carrying surface of said first spindle motor and from a movement path of said carriage, a distance between respective rotary axes of said first spindle motor and said second spindle motor located at said first position being larger than a sum of a radius of a disk to be carried by said second spindle motor and a radius of the disk carrying surface of said first spindle motor; and
  moving means for moving said second spindle motor between said first and second positions.

2. A disk player comprising:
  a housing;
  a disk conveying mechanism for conveying a disk to a play position; and
  playing means disposed within said housing, said playing means including a supporting mechanism, a first spindle motor fixedly mounted on said supporting mechanism and having a disk carrying surface, a carriage for carrying pickup means for a disk and arranged to move parallel to a plane containing said disk carrying surface of said first spindle motor, a second spindle motor having a disk carrying surface and arranged to move between a first position where said disk carrying surface of said second spindle motor is located substantially in the same plane as the disk carrying surface of said first spindle motor and a second position where the disk carrying surface of said second spindle motor is separated by a predetermined distance from the plane containing said disk carrying surface of said first spindle motor and from a movement path of said carriage, and moving means for moving said second spindle motor between said first and second positions, a distance between respective rotary axes of said first spindle motor and said second spindle motor located at said first position being larger than a sum of a radius of a disk to be carried by said second spindle motor and a radius of the disk carrying surface of said first spindle motor;
  said disk conveying mechanism including a disk carrying portion adapted to be projected out of said housing and for carrying said disk so as to move said disk in a first direction parallel to the disk carrying surface of said first spindle motor and a second direction perpendicular to said first direction and a drive mechanism for driving said disk carrying portion;
  said disk carrying portion including a first carrier for carrying a disk to be mounted on said first spindle motor and a second carrier for carrying a disk to be mounted on said second spindle motor, said first and second carriers being arranged to be movable relatively to each other within a plane parallel to the disk carrying surface of said first spindle motor, a relative movement of said first and second carriers being effected in response to a projection and accommodating operation of said disk carrying portion with respect to said housing.

3. A disk player as recited in claim 2, further comprising:
  a rack attached to said disk conveying mechanism;
  a rotatable gear engaging said rack; and
  a rotary encoder coupled to said rotatable gear for detecting a position of said disk carrying portion.

4. A disk player comprising:
  a housing;
  playing means disposed within said housing;
  a disk conveying mechanism for conveying a disk to play position; and
  a clamping mechanism for clamping said disk conveyed to said play position;
  said playing means including a supporting mechanism, a first spindle motor fixedly mounted on said supporting mechanism and having a disk carrying surface, a carriage for carrying pickup means for a disk arranged to move along a plane containing said disk carrying surface of said first spindle motor, a second spindle motor having a disk carrying surface and arranged to move between a first position where said disk carrying surface of said second spindle motor is located substantially in the same plane as the disk carrying surface of said first spindle motor and a second position where the disk carrying surface of said second spindle motor is separated by a predetermined distance from the plane containing said disk carrying surface of said first spindle motor and from a movement path of said carriage, and moving means for moving said second spindle motor between said first second position, a distance between respective rotary axes of said first spindle motor and said second spindle motor at said first position being larger than a sum of a radius of a disk to be carried by said second spindle motor and a radius of the disk carrying surface of said first spindle motor;

said clamping mechanism including a first and a second pressing member for clamping respective disks in cooperation with said first and second spindle motors respectively, contact and separation of said first and second pressing members with and from said first and second spindle motors respectively being carried out separately from each other and by means of driving force given by said disk conveying mechanism.

* * * * *